(12) United States Patent
Schröder

(10) Patent No.: US 7,962,175 B2
(45) Date of Patent: Jun. 14, 2011

(54) METHOD FOR DIMENSIONING HARDWARE COMPONENTS FOR BASE STATIONS OF CDMA COMMUNICATIONS NETWORKS

(75) Inventor: Bernd Schröder, Oldenburg (DE)

(73) Assignee: T-Mobile Deutschland GmbH, Bonn (DE)

( * ) Notice: Subject to any disclaimer, the term of this patent is extended or adjusted under 35 U.S.C. 154(b) by 1002 days.

(21) Appl. No.: 11/573,597

(22) PCT Filed: Aug. 18, 2005

(86) PCT No.: PCT/EP2005/008939
§ 371 (c)(1),
(2), (4) Date: Jul. 10, 2007

(87) PCT Pub. No.: WO2006/018300
PCT Pub. Date: Feb. 23, 2006

(65) Prior Publication Data
US 2007/0275689 A1    Nov. 29, 2007

(30) Foreign Application Priority Data

Aug. 19, 2004   (DE) .......................... 10 2004 040 294

(51) Int. Cl.
*H04M 1/00* (2006.01)
*H04W 40/00* (2009.01)
(52) U.S. Cl. ........................ 455/561; 455/446

(58) Field of Classification Search .................. 370/229, 370/338, 238; 455/561, 446, 453; 709/223
See application file for complete search history.

(56) References Cited

U.S. PATENT DOCUMENTS
2004/0068556 A1 * 4/2004 Radpour ....................... 709/223

OTHER PUBLICATIONS

Harri Holma; Uplink Admission Control and Soft Capacity with MUD in CDMA; Nokia telecommunications; pp. 431, 433, and 434.*
Holma, H. et al., "Uplink Admission Control and Soft Capacity With MUD in CDMA", Vehicular Technology Conference, Fall, 1999, IEEE VTS 50th Amsterdam, Netherlands.
Salkola, M., "CDMA Capacity—Can You Supersize That?", Wireless Communications and Networking Conference, Mar. 2002, Piscataway, New Jersey.

* cited by examiner

*Primary Examiner* — George Eng
*Assistant Examiner* — Michael Faragalla
(74) *Attorney, Agent, or Firm* — Baker & Daniels LLP

(57) ABSTRACT

The invention relates to a method for dimensioning hardware components for base stations of CDMA communication networks, especially hardware components of a UMTS base Station (node B). The number of hardware components, that is Channel elements (CE) and modems (M), required for the individual base stations in order to maintain a defined blocking probability, is determined on the basis of the spatial traffic distribution and a CDMA network comprising base stations.

11 Claims, 1 Drawing Sheet

Figure 1:
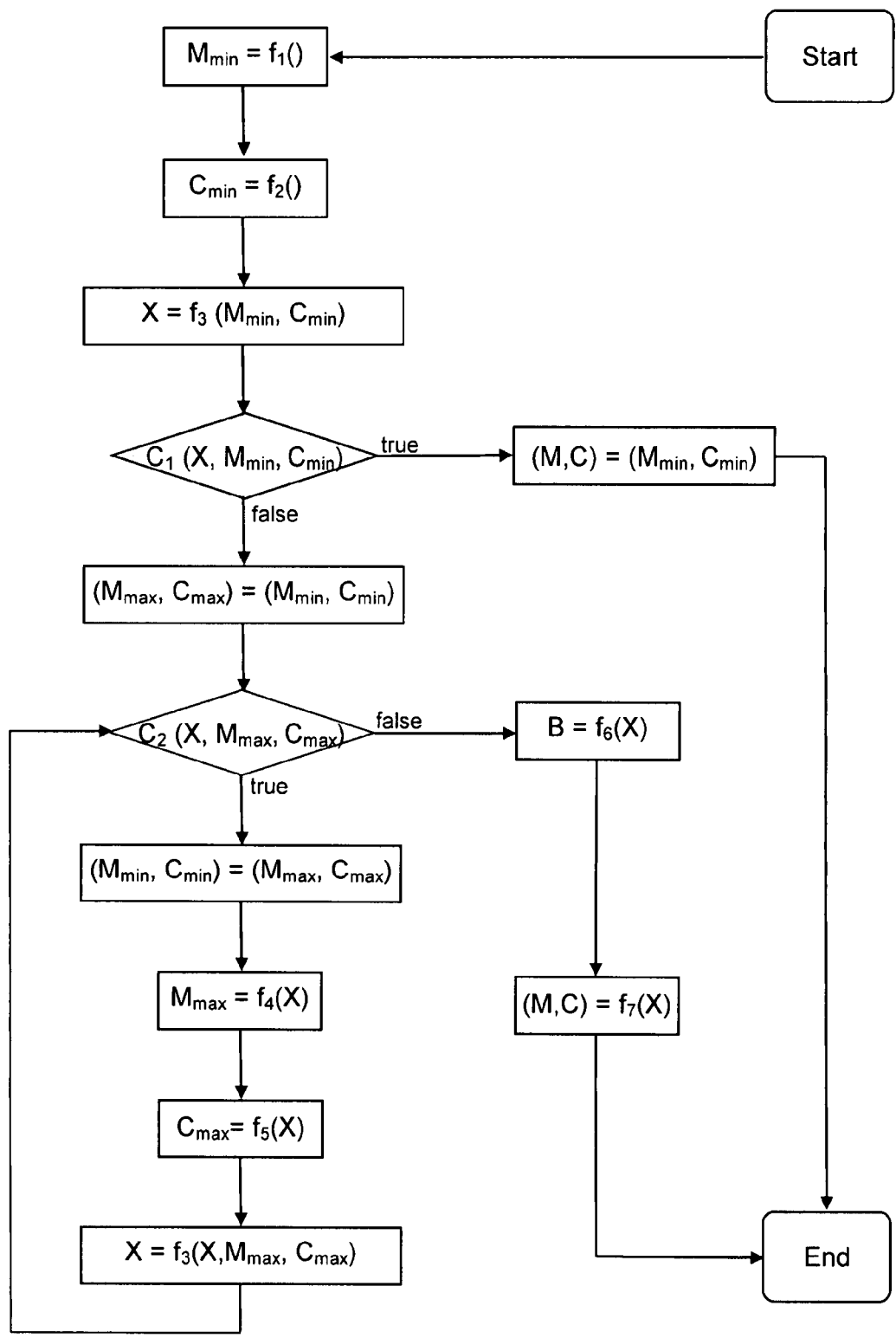

METHOD FOR DIMENSIONING HARDWARE COMPONENTS FOR BASE STATIONS OF CDMA COMMUNICATIONS NETWORKS

CROSS-REFERENCE TO RELATED APPLICATION

This application is related to and claims the benefit under 35 U.S.C. §119 and 35 U.S.C. §365 of International Application No. PCT/EP2005/008939, filed Aug. 18, 2005.

The invention relates to a method for dimensioning connection-oriented and carrier-oriented hardware for the air interface of CDMA communication networks, in particular in consideration of the soft capacity and the simultaneous existence of various bearer services.

Previous methods were able to dimension either connection-oriented hardware, for example based on Erlang B or similar product form solutions, or also carrier-oriented hardware for the simultaneous existence of several carrier services on the basis of the multi-dimensional Erlang formula or similar product form solutions, however not both questions simultaneously. The Erlang B loss formula is applied in communication systems in order to estimate the number of necessary channels for speech connections. The three variables are the offer (typically in the main traffic hour) in the unit Erlang, the maximum blocking probability and the number of channels: the activity expressed in the pseudo-unit Erlang is calculated from the ratio of the time at which a channel was actually used divided by the time at which it would have been available in total: The blocking probability specifies the probability with which a call could not be set up due to occupied channels and therefore had to be rejected (thus loss occurs). A value of 0.05 thus indicated 5 rejected (blocked) calls in 100 call setup attempts. The number of the channels is the number of available traffic channels.

One method of the above described type is described in the publication US 2004/068556 A1. This publication relates to method for dimensioning of packet-based radio networks, wherein a number of users or a number of required traffic channels of the base stations are determined for reaching a specified traffic throughput. In this connection only one type of channels or hardware components is dimensioned, never two different types simultaneously. Further dimensioning is performed only on one target throughput for a specified number of channels.

The object of the invention for one aspect thereof consists in specifying a method for the simultaneous dimensioning of so-called channel elements and modems in a base station (node B) of a CDMA network in consideration of network load and observing predefined blocking probabilities.

Further objectives of the invention for certain embodiments thereof are investigations on the capacity of the air interface in the case of predefined hardware equipment of a base station and predefined user conduct (hard capacity), investigations on the influence of speeds on the performance of connections between BS and users, and development and validation of methods for determination of the supply probabilities in the uplink in consideration of pixel-individual traffic distributions.

The posed problem is solved in accordance with the invention by the features of patent claim 1.

Advantageous designs and preferred features of the method in accordance with the invention are defined in the dependent claims.

The essential expansion of the method in accordance with the invention compared to the previously known methods lies in the inclusion of "soft" capacity, that is, a limited network capacity in consideration of on-net interferences.

In the following an exemplary embodiment of the dimensioning method in accordance with the invention will be explained. The method is preferably implemented and executed in the form of a software program on a personal computer.

DEFINITIONS

The input parameters for application of the method for dimensioning of hardware components of a base station consist of a quantity of services and a quantity of sectors for which the respective specified parameters must be specified. In addition the costs $K_M$ and $K_C$ for a modem pair or a channel element are defined.

The set of the services is designated with S and each service S is characterized by the following quantities:

| | |
|---|---|
| $S.E[\omega^k], k = 1, 2$: | Moments of the uplink service load factor |
| $S.VAR[\omega]$: | Variance of the uplink service load factor |
| $S.E[\gamma^k], k = 1, 2$: | Moments of the downlink service load factor |
| $S.v_{up}$: | Uplink activity factor (mean activity) |
| $S.v_{down}$: | Downlink activity factor (mean activity) |
| $S.C$: | required CEs (uplink and downlink together) |
| $S.M = 2$: | required modems (uplink and downlink together) |
| $S.B^*$: | predefined blocking probability |
| $S.\theta$: | Factor that specifies by how much the pure "soft" blocking probability may be exceeded |

The set of the sectors at the considered base station is designated with Z. For each sector $Z \in Z$ the following parameters are specified:

| | |
|---|---|
| $Z.a_S$: | Traffic intensity of service S [Erl] |
| $Z.\eta_{th}$: | Blocking threshold for the uplink (load factor) |
| $Z.\hat{T}_{th}$: | Blocking threshold for the downlink (base station performance) |
| $Z.E[\Gamma]$: | Mean value of the foreign cell load |
| $Z.VAR[\Gamma]$: | Variance of the foreign cell load |
| $Z.E[Q_S^k], k = 1, 2$: | Moments of the position load factor [mW$^k$] |
| $Z.E[Q_{S1}, Q_{S2}]$, | Expectation value of the product of two position load factors [mW$^2$] |
| $Z.\hat{T}_{const}$: | constant base station performance [Mw] |

The method in accordance with the invention is based on the fact that for each base station the minimum number of hardware components is determined with which the predefined blocking probabilities are observed. If this object is not attainable on the basis of the restricted "soft" capacity, the hardware components are dimensioned in such a way that the "soft" blocking probability, i.e. in the case of unrestricted hardware resources, is increased by no more than a predefined factor.

Let $B_{Z,S}[M,C]$ be the common "soft" and "hard" blocking probability for service S in sector Z, in case the base station is equipped with M modem pairs and C channel elements. Then the hardware dimensioning can be formulated as an optimization problem:

Object Function:

$$\min\{MK_M + CK_C\}$$

Boundary Conditions:

$$\forall Z \in Z, S \in S: B_{Z,S}[M,C] \leq \max\{S.B^*, B_{Z,S}^{soft} \cdot S.\theta\}$$

The designation $B_{Z,S}^{soft}$ here stands for the pure "soft" blocking probability without locking by hardware restrictions. In addition to the input parameters which describe the problem, a few more parameters are required which control the flow of the algorithm. These serve the special purpose of setting the trade off between precision and run time of the algorithm.

$\xi_{hard}$: Parameter, beginning at which it is assumed that no more hard blocking occurs at a base station. In case the pure hardware blocking lies below $\xi_{hard}$, this corresponds to infinite hardware and the blocking probabilities depend only on the soft capacity of the sectors. $\xi_{hard}$ should in any case be selected significantly smaller than the smallest target blocking probability.

$\xi_{soft}$: Parameter, beginning at which it is assumed that a service in a state is considered soft blocked. $\xi_{soft}$ should thus be almost 1 and should hold values in the range [0.99; 1]. Usage in the function isSoftBlocked.

Dimensioning Method

The method for dimensioning the hardware components at a base station consists of several partial steps.

First the modems and channel elements are dimensioned separately from one another, since a fixed lower bound is predefined for the number of required hardware components. Accordingly for this initial configuration, $C_{min}$ and $M_{min}$ the calculation of blocking probabilities is performed. In the process modems and channel elements are jointly considered and soft blocking is included in the uplink and downlink.

If the predefined blocking probabilities are now fulfilled for all sectors, the dimensioning is concluded. Otherwise it must be distinguished whether the soft capacity has already been achieved for all sectors. In this case the hardware components are reduced so far that the blocking probabilities are no more than a value θ above the pure blocking probabilities. Otherwise the number of hardware components is further increased. For this purpose the number of modems for the constant $C_{min}$ channel elements is increased until no more blocking by modems occurs. Also the number of channel elements for $M_{min}$ modems is increased. This increase of the modems and channel elements is performed until either the desired blocking probabilities are reached or no more reduction of the blocking probabilities is achieved through additional hardware, since the soft capacity is achieved in the corresponding sectors. The $C_{max}$ and $M_{max}$ resulting from this represent an upper limit for the required modems. The blocking probabilities for all configurations with less than $C_{max}$ or $M_{max}$ are determined and from all configurations which observe the predefined blocking probabilities, the one with the lowest costs is selected.

In the following the dimensioning algorithm is described in pseudocode and represented in a flow chart:

```
function (M,C)=DimHardware(Z,S)
    Minimum Number Modems: M_min = DimPureModem(Z, S)
    Minimum Number Channel Elements: C_min =
        DimPureChannelElements(Z, S)
    State Space: X = StateSpace(θ, 0, 0, M_min, C_min, S, Z)
    If is BlockProOk(X, M_min, C_min, Z, S)
        M = M_min, C = C_min
    else
        M_max = M_min, C_max = C_min
        while is AdditionalHardwareRequired(X, M_max, Cmax, Z, S)
```

Maximum Number Modems:
$M_{max}$ = DimModem(X, min, $C_{min}$, S, Z)
Maximum Number Channel Elements:
$C_{max}$ = DimChannelElement (X,$M_{min}$, $C_{max}$, S, Z)
State Space
X = StateSpace(X, $M_{min}$, $C_{min}$, $M_{max}$,$C_{max}$, S, Z)
end
Blocking Probabilities:
{Bz,s} = BlockProbAll(X,$M_{max}$, $C_{max}$, S, Z)
(M, C) = DimModemChannelElement($B_{z,s}$, M, C, Z, S)
end
end FIG. 1 shows a corresponding flowchart for the aforementioned dimensioning algorithm, wherein the following functions were used:

$f1$ (DimPureModem): Dimensions the number of modems without restriction through channel elements or soft capacity.

$f2$ (DimPureChannelElement): Dimensions the number of channel elements without restriction through modems or soft capacity.

$f3$ (StateSpace): Calculates the state space in particular state probabilities and "local" blocking probabilities for a predefined number of modems and channel elements.

$f4$ (DimModem): Increases the number of modems with a predefined number of channel elements until either the demanded blocking probabilities are reached or no more blocking occurs by modems.

$f5$ (DimChannelElement): Increases the number of channel elements with a predefined number of modems until either the demanded blocking probabilities are reached or no more blocking occurs by channel elements.

$f6$ (BlockProbAll): Calculates the blocking probabilities for all hardware configurations with maximum M modems and maximum C channel elements for an already calculated state space with M modems and C channel elements.

$f7$ (DimModemChannelElement): Determines for each service in each sector whether dimensioning takes place according to the predefined blocking probability or whether the soft capacity for this is does not suffice. Determines the hardware configuration with the minimum costs which observes the predefined blocking probabilities or soft blocking probabilities for a predefined maximum hardware configuration.

The following conditions apply:

c1 (isBlockProbOk): Determines whether the predefined blocking probabilities are observed for a state space.

c2 (isAdditionalHardwareRequired): Determines whether additional hardware is required for a state space.

The Used Functions Will Now be Explained in Detail:

The isBlockProbOk function checks whether the predefined blocking probabilities are observed for all services and sectors for a state space X with M modem pairs and C channel elements:

```
function is BlockProbOk(X, M, C, Z, S)
    forall Z ∈ Z
        forall S ∈ S
            B_{Z,S} = BlockProb((X, M, C, Z, S)
            if B_{Z,S} > S·B*
                returnfalse
            end
        end
    end
```

```
        return true
    end
```

The isAdditionalHardwareRequired function checks whether additional hardware, i.e. modems or channel elements are required. Additional hardware is required in case there is at least one sector in which the predefined blocking probabilities for at least one service are not being observed but at the same time the soft capacity of this sector also has not been completely exhausted:

```
function isAdditionalHardwareRequired(X, M, C, Z̃, S)
    for all Z ∈ Z̃
        forall S ∈ S
            B_{Z,S} = BlockProb(X, M, C, Z, S)
            If B_{Z,S} > S·B* ∧ not iaSoftBlocked(X, M, C, Z, S)
                return true
            end
        end
    end
    return false
end
```

Pure Modem Dimensioning

The minimum number $M_{min}$ of modems is determined by first determining the system capacity only by the number of modems. This number is then only overdimensioned in case the soft capacity does not suffice to meet the traffic requirement. The pure modem dimensioning is performed directly via the Erlang B formula. In the following the DimPureModem function is described in pseudocode:

```
function M. = DimPureModem(Z,S)
```

Overall Traffic Intensity: $a = \sum_{z \in Z} \sum_{s \in S} Z \cdot a_s$

Number Modem Pairs: M = 0
Probability of the Blocking State: P=1
Normalization Constant: N=1
Blocking Probability: B=1 while $B > \max_{s \in S}(S.B^*)$

M = M + 1

$P = P \cdot \dfrac{a}{M}$

N = N + P
    B = P/N
end
\\ Note: Modems are only considered in pars (Uplink and Downlink)

Pure Channel Element Dimensioning

The minimum number $C_{min}$ of channel elements is determined by first determining the system capacity only by the number of channel elements. This number is only overdimensioned in case the software capacity does not suffice to meet the traffic requirement. The pure channel element dimensioning is performed recursively. In the following the DimPureChannelElement function is described in pseudocode:

```
function C = DimPureChannelElement(Z, S)
```

Traffic intensity per service over all sectors: $a_s = \sum_{z \in Z} Z \cdot a_s$ Number Channel Elements: C = 0
State Probability: P[0] = 1
Blocking Probability for Service S: $B_S$ = 1
    while $\exists S \in S : B_S > S.B^*$
        C = C + 1

$$P[C] = \sum_{S \in S | S \cdot C \leq C} P[C - S \cdot C] \cdot a_S \frac{S \cdot C}{C}$$

$$P = \frac{P}{1 + P[C]}$$

\\ P is a vector here $$B_S = \sum_{c = \max\{0, C - S \cdot C + 1\}}^{C} P[c]$$

end
end

Calculation of the State Probabilities and Soft Blocking Probabilities for a State Space In this section the algorithm for determining the state and soft blocking probabilities in consideration of soft and hard capacity is described. The number of hardware components is defined with M modem pairs (uplink and downlink) and C channel elements. The algorithm is based on a recursive calculation of the state probabilities, wherein a state is described by the number of occupied modems and channel elements. The algorithm includes the case that a smaller state space was already calculated whose state description can be recursively accessed.

The state space is designated with X, the state with M occupied modems and C occupied channel elements is designated as X[M,C]. The notation X[M,C] designates the subspace with all states in which a maximum of M modems and a maximum of C channel elements are occupied. For each state X the following quantities are recursively determined:

| | |
|---|---|
| $X.P_S$: | Probability of reaching the state by transition with service S |
| X.P: | State probability |
| $X.E[N_{Z,S}]$: | an number subscribers of service S in sector Z |
| $X.p_{Z,S}$: | Probability that a subscriber in sector Z has service S |
| $X.E[\eta_Z]$: | Mean value of the uplink load for sector Z |
| $X.VAR[\eta_Z]$: | Variance of the uplink load for sector Z |
| $X.E[\hat{T}_Z^k]$, k = 1, 2: | $1^{st}$ and $2^{nd}$ moment of the base station performance for the subscribers in sector Z |
| $X.E[\psi_Z]$: | Mean value of the downlink load in sector Z |
| $X.\beta_{Z,S}$: | Soft blocking probability in sector Z for service S |

In the following it is assumed that for the subspace $X[M_{init}, C_{init}]$ the states X with the above quantities are already determined. The sum of the state probabilities of the subspace must obviously amount to 1. For $M_{init} = C_{init} = 0$, i.e. when no subspace is predefined, the minimum subspace X[0, 0] is initialized in the following way:

```
function X = initStateSpace(Z,S)
    X[0,0].P = 1
    X[0,0].E[ηz] = 0
    X[0,0].VAR[ηz] = 0
    X[0,0].E[T̂_Z] = 0
    X[0,0].E[T̂_Z^2] = 0
    X[0,0].E[ψZ] = 0
    forall Z ∈ Z
        forall S ∈ S
            X[0,0].E[N_{Z,S}] = 0
            X[0,0].p_{Z,S} = 0
        end
    end
    forall Z ∈ Z
        forall S ∈ C S
            X[0,0].β_{Z,S} = SoftBlockProb(X[0,0],Z,S,S)
        end
    end
end
```

Proceeding from this initialized state space with $M_{init}$ modems and $C_{init}$ channel elements the state space X[M, C] is determined by the StateSpace function.

```
function (χ,[NormConst]) = StateSpace (χ,M_init, C_init, Mc C, S, Z)
    NormConst = 1
    if M_init = C_init − 0
        χ = initStateSpace(Z,S)
    end
    for m=M_init + 1 to M
        for c=0 to C_init
            X[m,c] = State(m,c, χ[m − 1, c − 1], Z,S)
            \\ χ [m,c] = θ, in case m < 0 or c < 0
            NormConst = NormConst + X[m,c].P
        end
    end
    for m=0 to M
        for c=C_init + 1 to C
            X[m,c] = State(m,c, χ [m −1, c − 1], Z, S)
            \\ χ[m,c] = θ, in case m < 0 or c < 0
            NormConst = NormConst + X[m,c].P
        end
    end
```

$$\chi[M, C] \cdot P = \frac{x[M, C] \cdot P}{NormConst}$$

\\ χ[M,C].P designates the M × C-matrix with the state probabilities
...,

Used Functions

The State function determines the state probabilities, the system quantities and the blocking probabilities for the state with m modem pairs and c channel elements. In the process it is assumed that the states with fewer modem pairs or channel elements are already known. The algorithm assumes that the states satisfy the local balance equations, the state probabilities thus can be determined relative to the probabilities of the already determined states. In the case of this algorithm it is a matter of an approximation since in the case of the local balance equations small deviations occur due to the local blocking probabilities.

```
function X = State(M, C, X, Z, S)
    \\ State probabilities
    forall S ∈ S
        IfisReachable(M − 1, C − S.C,S)
```

$$X[M, C] \cdot P_S = X[M − 1, C − S \cdot C] \cdot P \cdot$$
$$\left( \sum_Z (1 − X[M − 1, C − S \cdot C] \cdot \beta_{Z,S}) \cdot Z \cdot a_S \right) \frac{S \cdot C}{C}$$

```
        else
            X[M,C].P_S = 0
        end
    end
```

$$X[M, C] \cdot P = \sum_{S \in S} X[M, C] \cdot P_S$$

```
    forall S ∈ S
```

$$X[M, C] \cdot P_S = \frac{X[M, C] \cdot P_S}{X[M, C] \cdot P}$$

```
    end
    forall Z ∈ Z
        forall S ∈ S
            X[M, C].E[N_{Z,S}] = UserNumber(X[M, C], X, M, C, Z, S, S)
        end
    forall S ∈ S
        If X[M,C].E[N_{Z,S}] > 0
```

$$X[M, C] \cdot p_{Z,S} = \frac{X[M, C] \cdot E[N_{Z,S}]}{\sum_{s' \in s} \cdot X[M, C] \cdot E[N_{Z,S'}]}$$

```
        else
            X[M,C].pz,s = 0
        end
    end
    (X[M,C].E[η_Z], X[M,C].VAR[η_Z]) = UplinkLoad(X[M,C],X, M, C, Z, S)
```

$$\left( X[M, C] \cdot E[\hat{T}_Z], X[M, C] \cdot E[\hat{T}_Z^2] \right) = BTS − Tx − Power (X[M, C],$$

$X, M, C, Z, S)$

```
    X[M,C].E[ψ_Z] = DownlinkLoad(X[M,C],X,M,C,Z,S)
    forall S ∈ S
        X[M,C].β_{Z,S} = SoftBlockProb(X[M,C],Z,S,S)
    end
end
```

The isReachable function checks whether a state can be reached at all. States are only reachable when per modem pair at least the minimum number of channel elements is occupied, however no more than the maximum number. The minimum and maximum number of channel elements arises from the service with the lowest or greatest channel element requirement.

```
function isReachable(M, C, S)
    if M < 0
        return false
    else
```

$$\text{if } M \cdot \min_{S \in S}\{S \cdot C\} \leq C \leq M \cdot \max_{S \in S}\{S \cdot C\}$$

return true

-continued

```
        else
            return false
        end
    end
end
```

The SoftBlockProb function determines the local blocking probability in state X for service S in sector Z. That is the probability with which a subscriber who is located in sector Z and want to communicate with service S is rejected in case the system is currently in state X.

```
function β = SoftBlockProb(X,Z,S,S)
    β = 1 − (1 − SoftBlockProbUp(X,Z,S))(1 − SoftBlockProbDown
    (X,Z,S,S))
end
```

The SoftBlockProbUp determines the probability with which a subscriber with service S in sector Z will be blocked because the uplink capacity is exhausted.

```
function β = SoftBlockProbUp(X,Z,S)
    E[η_all] = X·E [ηz] + S·E [ω] + Z·E [Γ]
    VAR[η_all] = X·VAR[ηz] + S·VAR [ω] + Z·VAR[Γ]
    (μ,σ) = Mom2ParLN(E[η_all], VAR[η_all])
    β = 1 − LN_{μ,σ}(Z·η_th)
end
```

The SoftBlockProbDown determines the probability with which a subscriber with service S in sector Z will be blocked because the downlink capacity is exhausted.

```
function β = SoftBlockProbDown(X, Z, S, S)
    E[T̂_all] = X·E[T̂_Z] + S·E[γ] · Z·E[Q_S]
    E[T̂²_all] = X · E[T̂²_Z] + 2 · X · E[ψz] · S · E[γ] · ∑_{S'∈S} X · p_{Z,S'} · Z · E[Q_{S'} Q_S] +
    S·E[γ²]·Z·E[Q²_S]
    VAR [T̂_all] = E[T̂²_all] − E[T̂_all]²
    (μ, σ) = Mom2ParLN(E[T̂_all], VAR[T̂_all])
    β = 1 − LN_{μ,σ}(Z·T̂_th − Z·T_const)
end
```

The UserNumber function calculates recursively how many users of a service on the average are in a state in the system

```
function E[N] = UserNumber(Y,X,M,C,Z,S,S)
    E[N] = 0
    forall S' ∈ S\S
        If M > ∧ C ≥ S'·C
            if S' ≠ S
                E[N] = E[N] + Y·P_{S'} · X[M − 1,C − S' ·C]·E
                [N_{z,s}]
            else
                E[N] = E[N] + Y·P_{S'} · X[M − 1,C − S' ·C]·E
                [N_{z,s}] + 1
            end
    end
end
```

-continued

```
        end
    end
```

The UplinkLoad function determines the mean value and the variance of the load which is in sector Z in state X.

```
function (E[η], VAR[η]) = UplinkLoad(Y, X, M, C, Z, S)
    E[η] = 0
    E[η²] = 0
    forall S ∈ S
        if M > 0 ∧ C ≥ S.C
            E[η] = E[η] + Y·P_S · (X[M − 1, C − S.C].E[η_Z] + S.v_{up} · S.E[ω])

E[η²] = E[η²] + Y · P_S · (X[M − 1, C − S · C] · E[η²_Z] + 2 · X[M − 1,
            C − S · C]·E[η_Z]·S·v_{up}·S·E[ω] + S·v_{up}·S·E[ω²])
        end
    end
    VAR[η] = E[η²] − E[η]²
end
```

The DownlinkLoad function determines the mean value of the load which is in sector Z in state X.

```
function E[ψ] = DownlinkLoad(Y,X,M,C,Z,S)
    E[ψ] = 0
    forall S ∈ S
        If M > 0 ∧ C ≥ S·C
            E[ψ] = E[ψ] + Y·P_S · (X[M − 1, C − S·C]·E
            [ψ_Z] +S·v_{down} : S·E[γ])
        end
    end
end
```

The BTS-Tx-Power function determines the first and second moment of the base station performance in sector Z in case the system is in state X.

```
function (E[T̂], E[T̂²]) = BTS-Tx-Power(Y,X,M,C,Z,S)
    E[T̂] = 0
    E[T̂²] = 0
    forall S ∈ S
        if M > 0 ∧ C ≥ S.C
            E[T̂] = E[T̂] + Y·P_S · (X[M − 1, C − S.C].E[T̂_Z] + S·v_{down} ·
            S.E[γ] · Z.E[Q_S])

E[T̂²] = E[T̂²] + Y · P_S · (X[M − 1, C − S · C] · E[T̂²_Z] + 2 · X[M − 1,
            C − S · C]·E[ψ_Z]·S · v_{down} · S · E[γ] ·
            ∑_{S'∈S} X[M, C] · p_{Z,S'} · Z · E[Q_{S'}, Q_S] + S · v_{down} · S · E[γ²] · Z · E[Q²_S])
        end
    end
end
```

Determining Soft/Hard Blocking Probabilities for Modems and Channel Elements

The BlockProb function determines the blocking probabilities for all services in all sectors for a predefined number of M modem pairs and C channel elements. The blocking probabilities include soft and hard blocking.

--- function $B_{Z,S}$ = BlockProb(X, M, C, Z, S)

$$B_{Z,S} = \sum_{m=0}^{M-1} \left( \sum_{c=0}^{C-S \cdot C} X[m,c] \cdot P \cdot X[m,c] \cdot \beta_{Z,S} + \sum_{c=max\{0,C-S \cdot C+1\}}^{C} X[m,c] \cdot P \right) + \sum_{c=0}^{C} X[M,c] \cdot P$$

end

---

The HardBlockProb function determines the hard blocking probabilities for all services in all sectors for a predefined number of M modem pairs and C channel elements.

--- function B = HardBlockProb(X, M, C, $C_{max}$)

$$B = \sum_{m=0}^{M-1} \left( \sum_{c=max\{0,C-C_{max}+1\}}^{C} X[m,c] \cdot P \right) + \sum_{c=0}^{C} X[M,c] \cdot P$$

end

---

The isSoftBlocked function checks whether there is a reachable state in which hard blocking for service S occurs, however at the same time whether the soft capacity of the sector still suffices for accepting a user of service S with a specified probability.

--- function isSoftBlocked(X,M,C,Z,S)
    for m=0 to M
        if X[m, C − S·C + 1]·P > 0 ∧ X[m,C]·$\beta_{Z,S}$ < $\epsilon$soft
            return false
        end
    end
    for c=0 to C−S·C
        If X [M,c]·P > 0 ∧ X[M, c]·$\beta_{Z,S}$ < $\epsilon$soft
            return false
        end
    end
    return true
end

---

Dimensioning of the Modem With Given Channel Elements

In this section the DimModem function is described. This function determines the number of modems for which in the case of a predefined number of channel elements either the target blocking probabilities of all services are observed or a further increase of the number of modems no longer leads to a reduction of the blocking probabilities. The calculation of the blocking probabilities is performed recursively, building on the already calculated blocking probabilities. The DimModem function has the following appearance, wherein X is the state space that has already been calculated:

--- function M = DimModem(X, M, C, S, Z)

Soft Blocking Probabilities $B_{Z,S}^{Soft}[M, C] = \sum_{m=0}^{M-1} \sum_{c=0}^{C-S \cdot C} X[m,c].P \cdot X[m,c].\beta_{Z,S}$ Channel Element Blocking Probability: $B_S^C[M, C] = \sum_{c=max\{0,C-S.C+1\}}^{C} \sum_{m=0}^{M-1} X[m,c].P$ Modem Blocking Probability: $B^M[M, C] = \sum_{c=0}^{C} X[M,c].P$ Overall Blocking Probability: $B_{Z,S}[M, C] = B_{Z,S}^{Soft}[M, C] + B_S^C[M, C] + B^M[M, C]$ while ∃ Z, S: $B_{Z,S}[M, C] \geq S.B^* \wedge B^M[M, C] > \xi_{hard}$ M=M+1
    {X[M, C], NormConst} = StateSpace(X[M − 1, C], M − 1, C, M, C, S, Z)

$B^M[M, C] = \sum_{c=0}^{C} X[M,c].P$ forall S ∈ S $B_S^C[M, C] = \frac{B_S^C[M-1, C]}{NormConst} + \sum_{c=max\{C-S_S.C+1\}}^{C} X[M-1,c].P$ $$\text{forall } Z \in \mathcal{Z}$$

$$B^{Soft}_{Z,S}[M, C] = \frac{B^{Soft}_{Z,S}[M-1, C]}{\text{NormConst}} + \sum_{c=0}^{C-S.C} X[M-1, c].P \cdot X[M-1, c].\beta_Z$$

$$B_{Z,S}[M, C] = B^{Soft}_{Z,S}[M, C] + B^{C}_{S}[M, C] + B^{M}[M, C]$$

end
end
end
end

Dimensioning of the Channel Elements With Given Modems

In this section the DimChannelElement function is described. This function determines the number of channel elements for which in the case of a predefined number of modems either the target blocking probabilities of all services are observed or a further increase of the number of channel elements no longer leads to a reduction of the blocking probabilities. The calculation of the blocking probabilities is performed recursively, building on the already calculated blocking probabilities. The DimChannelElement function has the following appearance, wherein X is the state space that has already been calculated:

function $C = \text{DimModem}(X, M, C, S, \mathcal{Z})$

Soft Blocking Probabilities $B^{Soft}_{Z,S}[M, C] = \sum_{m=0}^{M-1} \sum_{c=0}^{C-S.C} X[m, c].P \cdot X[m, c].\beta_{Z,S}$ Channel Element Blocking Probability: $B^{C}_{S}[M, C] = \sum_{c=max\{0,C-S.C+1\}}^{C} \sum_{m=0}^{M} X[m, c].P$ Modem Blocking Probability: $B^{M}_{S}[M, C] = \sum_{c=0}^{C-S.C} X[M, c].P$ Overall Blocking Probability: $B_{Z,S}[M, C] = B^{Soft}_{Z,S}[M, C] + B^{C}_{S}[M, C] + B^{M}[M, C]$ while $\exists Z, S: B_{Z,S}[M, C] \geq S.B^* \wedge B^{C}[M, C] > \xi_{hard}$ $C = C+1$
$\{X[M,C], \text{NormConst}\} = \text{StateSpace}(X[M, C-1], M, C-1, M, C, S, Z)$
forall $S \in S$ $$B^{C}_{S}[M, C] = \sum_{c=max\{0,C-S_S.C+1\}}^{C} \sum_{m=0}^{M} X[m, c].P$$

$$B^{M}_{S}[M, C] = \frac{B^{M}_{S}[M, C-1]}{\text{NormConst}} + X[M, C-S.C].P$$

forall $Z \in \mathcal{Z}$ $$B^{Soft}_{Z,S}[M, C] = \frac{B^{Soft}_{Z,S}[M, C-1]}{\text{NormConst}} + \sum_{m=0}^{M-1} X[m, C-S.c].P \cdot X[m, C-S.C].\beta_{Z,S}$$

$$B_{Z,S}[M, C] = B^{Soft}_{Z,S}[M, C] + B^{C}_{S}[M, C] + B^{M}_{S}[M, C]$$

end
end
end
end

Blocking Probabilities for All Subspaces

The BlockProbAll function determines the blocking probabilities for all services and sectors, to be precise for all subspaces of the transferred state space. Thus if a state space for M modem pairs and C channel elements is transferred, the blocking probabilities for all hardware configurations m, c are determined with $0 \leq m \leq M$ und $0 \leq c \leq C$.

--- function $\{B_{Z,S}\}$ = BlockProbAll(X, M, C, Z, S)
    for m=0 to $M_{max}$
        for c=0 to $C_{max}$
            N[m, c] = N[m − 1, c] + N[m, c − 1] − N[m − 1, c − 1] + X[m, c].P
            \\ N[m, c]=0, falls m < 0 oder c < 0
            forall $S \in S$ $$B_S^H[m, c] = \left( \sum_{c'=c-S.C+1}^{c} \sum_{m'=0}^{m-1} X[m', c'].P \right) + \sum_{c'=0}^{c} P[m, c']$$

forall $Z \in Z$ $$B_{Z,S}^{Soft}[m, c] = B_{Z,S}^{Soft}[m-1, c] + B_{Z,S}^{Soft}[m, c-1] - B_{Z,S}^{Soft}[m-1, c-1] + X[m, c] \cdot P \cdot X[m, c].\beta_{Z,S}$$

\\ $B^{Soft}[m, c] = 0$, falls m < 0 oder c < 0

$$B_{Z,S}[m, c] = \frac{B_S^H[m, c] + B_{Z,S}^{Soft}[m-1, c-S.C]}{N[m, c]}$$

end
        end
    end
end

---

Optimum Hardware Configuration With Given Blocking Probabilities

The DimModemChannelElement function performs an exhaustive search for the optimum hardware configuration. For this purpose first all states are determined which fulfill the defaults for the blocking probabilities of the individual services. After that the costs for all of these hardware configurations are determined and the configuration with the minimum costs is selected.

--- function (M, C) = DimModemChannelElement($B_{Z,S}$, M, C, Z, S)
    forall $Z \in Z$
        forall $S \in S$
            if $B_{Z,S}[M,C] \leq S.B^*$
                \\ Target: Predefined Blocking Probability
                $S.B_Z = S.B^*$
            else
                \\ Target: Soft Blocking Probability
                $S.B_Z = \max\{S.B^*, B_{Z,S}[M_{max},C_{max}] \cdot S.\theta\}$
            end
        end
    end
    Valid = $\{(m,c) | \forall Z \in Z, S \in S: B_{Z,S}[m,c] \leq S.B_Z\}$ $$(M, C) = \arg\left( \min_{(m,c) \in Valid} \{m \cdot K \cdot M + c \cdot K \cdot C\} \right)$$

end

---

Notation and General Functions

In this section notation will be explained. In addition, generally common functions which are used in the dimensioning algorithm are listed.

$$(\mu_x, \sigma_x) = Mom2ParLN(E[X], VAR[X])$$

The Mom2ParLN function determines from mean value and variance of a logarithmic normal-distributed random variable their parameters.

$$LN_{\mu,\sigma}(X)$$

With $LN_{\mu,\sigma}(x)$ the distribution function of a logarithmic normal-distributed random variable is designated with parameters $\mu$ and $\sigma$.

Method for Determining the Input Parameters

In this section methods are specified for how the input parameters for the dimensioning method are determined. The dimensioning algorithm determines the hardware requirements for an individually considered base station. In the following, first a definition is given of what the input parameters for an entire UMTS network could look like and how the corresponding input parameters are derived from them.

Definition of a UMTS Network

A UMTS network is defined via the set B of the base stations, the set S of the offered services and the set F of the surface elements. The surface elements are squares which form a rectangle together, said rectangle then corresponding to the surface in which mobile subscribers are to be supplied from the UMTS network. The base stations are located on grid points. For each base station $B \in B$ the following quantities are defined:

| | |
|---|---|
| B.{x, y}: | Grid coordinates |
| B.Z: | Set of sectors |

Each sector Z is specified via the following quantities:

| | |
|---|---|
| Z.φ: | Angle of the antenna (x axis direction corresponds to 0 degrees) |

-continued

| | |
|---|---|
| $Z.N_0$: | Thermal noise in dBM/Hz (−174) |
| $Z.\eta_B$: | Blocking threshold for the uplink load |
| $Z.\eta_{th}$: | Blocking threshold for the uplink (load factor) |
| $Z.\hat{T}_{th}$: | Blocking threshold for the downlink (base station performance) |
| $Z.E\ [\hat{I}_{other}]$: | Mean value of the foreign interference [mW/Hz] |
| $Z.VAR[\hat{I}_{other}]$: | Variance of the foreign interference [mW/Hz] |
| $Z.\hat{T}_{const}$: | constant base station performance [mW] |

Additionally the set $Z^*$ of all sectors in the network is defined:

$$Z^* = \underset{B \in B}{Y} B.Z$$

A service $S \in S$ is defined via the following parameters:

| | |
|---|---|
| S.R: | Bit rate |
| $S.E\ [\epsilon^{up}]$: | Mean value of the $E_b/N_0$ values on the uplink, corresponds to the target $E_b/N_0$ value |
| $S.VAR\ [\epsilon^{up}]$: | variance of the $E_b/N_0$ values on the uplink, it is zero in the case of the assumption of perfect transmit load control |
| $S.E\ [\epsilon^{down}]$: | mean value of the $E_b/N_0$ values on the downlink, corresponds to the target $E_b/N_0$ value |
| $S.VAR\ [\epsilon^{down}]$: | variance of the $E_b/N_0$ values on the downlink, it is zero in the case of the assumption of perfect transmit load control |
| $S.v_{up}$: | uplink activity factor (mean activity) |
| $S.v_{down}$: | downlink activity factor (mean activity) |
| S.C: | required CEs (uplink and downlink together) |
| S.M = 2: | required modems (uplink and downlink together) |
| $S.B^*$: | predefined blocking probability |
| $S.\theta$: | maximum relative distance to the pure "soft" blocking probability |

A surface element $F \in F$ is specified via the following parameters:

| | |
|---|---|
| F.(x, y): | coordinates of the mean point |
| $F.a_S$: | subscriber density for service S |
| $F.N_0$: | thermal noise in dBm/Hz (−174) |

Additionally the propagation model is determined via the attenuation(F,Z) or attenuation (Z, F) function, which specifies the attenuation of a mobile station in surface element F to sector Z or vice versa. Thus if a mobile station in surface element transmits F with S mW, it is received in sector Z with $$S^R = S\ \text{attenuation}(F,Z))$$

The attenuation$_{dB}$ function supplies the corresponding values in the decibel range. While the attenuation function comprises only the path loss, shadow fading can be additionally considered. This
is modeled in the decibel range by a normal distribution with the mean value 0 dB and a standard deviation of $\sigma_{SF}$. The random variable for the shadow fading of sector Z to surface element F is designated with $\Theta_{Z,F}$.

Additionally the system bandwidth is designated with W and the orthogonality factor is designated with $\alpha$. Typical values for $\alpha$ lie in the range [0; 0, 4], wherein $\alpha=0$ means perfect orthogonality.

Traffic Intensity per Service and Sector

The load of a sector Z is determined by integration via the associated surface. In the simplest case with deterministic attenuation each surface element F is allocated to the sector for which it has the lowest attenuation. For the set of surface elements Z.F which are allocated to the sector Z, the following applies:

$$Z.F = \left\{ F \in F\ |\ Z = \arg\left(\min_{Y \in Z^*} \{\text{attenuation}(Y, F)\}\right) \right\}$$

The subscriber density for the service S in sector Z thus results as $$Z.a_s = \sum_{F \in Z.F} F.a_s$$

In the case of this allocation of the surface elements to the base station it is assumed that the attenuation is a deterministic function. If "shadow fading" is additionally considered, each surface element is only allocated to a base station with a specified probability:

$$Z.F = \left\{ F \in F\ \Big|\ \text{attenuation}_{dB}(Z, F) \geq \max_{Y \in Z^*} \{\text{attenuation}_{dB}(Y, F)\} - PL \right\}$$

Inversely with Z.F the set of all sectors is also defined to which a mobile station in surface element F can be connected:

$$F.Z = \{Z \in Z^* | F \in ZF\}$$

PL is a constant which specifies how large the range is by which a mobile station can be allocated to a geographically further removed base station and should be selected dependent on the standard deviation of the shadow fadings. The probability that a mobile station in the surface element $F \in Z.F$ will be allocated to the sector Z, is:

$$F.P_z = P\Big\{\text{attenuation}_{dB}(Z, F) + \Theta_{Z,F} \geq$$
$$\max_{Y \neq Z \in F.Z} \{\text{attenuation}_{dB}(Y, F) + \Theta_{Y,F}\}\Big\}$$

The traffic intensity for service S in sector Z thus results as $$Z.a_s = \sum_{F \in Z.F} F.P_z \cdot F.a_s$$

Moments of the Service Load Factors

The algorithm for hardware dimensioning defines the soft resources requirement via the moments of the uplink or downlink service load factors. The uplink service load factor $S.\omega$ for a service S is defined as:

$$S.\omega = \frac{S.R \cdot S.\hat{\epsilon}^{up}}{W + S.R \cdot S.\hat{\epsilon}^{up}},$$

wherein $S.\epsilon^{up}$ is a normal-distributed random variable for the $E_b/N_0$ values received on the uplink in the decibel range which is defined by the mean value $S.E[\epsilon^{up}]$ and the variance $S.VAR[\epsilon^{up}]$. The random variable $S.\hat{\epsilon}^{up}$ corresponds to the random variable $S.\epsilon^{up}$ in the linear range. The k moment is determined by the numerical calculation of the following integral:

$$E[S.\omega^k] = \int_{-\infty}^{\infty} a_{\epsilon}up(\varepsilon) \left( \frac{dB2Lin(\varepsilon) \cdot S.R}{W + dB2Lin(\varepsilon) \cdot S.R} \right)^k d\varepsilon$$

Here $\alpha_{\epsilon^{up}}(\epsilon)$ is the distribution density function of the random variable $\epsilon^{up}$, which is $N(S.E[\epsilon^{up}], S.STD[\epsilon^{up}])$ distributed. With $N(\mu, \sigma)$ a normal-distributed random variable is designated with mean value $\mu$ and standard deviation $\sigma$.

For the downlink it applies analogously that the service load factor $S.\gamma$ for the service S is defined as $$S.\gamma = \left( \frac{S.R \cdot S.\hat{\varepsilon}^{down}}{W + \alpha \cdot S.R \cdot S.\hat{\varepsilon}^{down}} \right)$$

The orthogonality factor is designated with $\alpha$ and $S.\epsilon^{down}$ is a normal-distributed random variable for the $E_b/N_0$ values received on the downlink in the decibel range. The k moment is determined by the numerical calculation of the following integral:

$$E[S \cdot \gamma^k] = \int_{-\infty}^{\infty} a_{\varepsilon}down(\varepsilon) \left( \frac{dB2Lin(\varepsilon) \cdot S.R}{W + \alpha \cdot dB2Lin(\varepsilon) \cdot S.R} \right)^k d\varepsilon$$

Here $\alpha_{\epsilon^{down}}(\epsilon)$ is the distribution density function of the random variable $\epsilon^{down}$ which is $N(S.E \epsilon^{down}, S.STD[\epsilon^{down}]$ distributed.

Moments of the Foreign Cell Load

In the simplest case it is assumed that the interference of mobile stations which belong to other base stations or to another sector of the same base station is independent of the uplink load of the considered base station. Mean value and variance of the foreign interference are in this case given for each sector Z. The input parameters for the dimensioning algorithm, thus mean value and variance of the foreign cell load for each sector result as:

$$Z.E[\Gamma] = (1 - Z\eta_{th}) \frac{Z.E[\hat{I}_{other}]}{(Z.\hat{N}_0)}$$

$$Z.VAR[\Gamma] = (1 - Z.\eta_{th})^2 \frac{Z.VAR[\hat{I}_{other}]}{(Z.N_0)^2}$$

Moments of the Position Load Factor

The position load factor is, in contrast to the service load factor, not dependent on the service of a user, but rather from his position. The position load factor $F.Q$ of a surface element $F$ corresponds to a service-independent performance part which a base station which transmits in sector Z with $F \in Z.F$ with load limit $Z.\hat{T}_{th}$, must summon up for this surface element. The position load factor is thus the interference which a subscriber in the considered surface element sees, converted to the base station performance that is required to achieve a service-adjusted target $E_b/N_0$, that is $E_b/N_0$ divided by processing gain. The position load factor $F.Q$ is defined as:

$$F.Q = W \cdot F.\hat{N}_0 \cdot F.\delta_Z + \sum_{Y \in Z^* \setminus Z} Y.\hat{T} \cdot F.\Delta_{Z,Y}$$

In the process $F.\delta_Z$ and $F.\Delta_{Z,Y}$ are notations for:

$$F.\delta_Z = \frac{1}{\text{attenuation}(Z, F)}$$

$$F.\Delta_{Z,Y} = \frac{\text{attenuation}(Y, F)}{\text{attenuation}[Z.F]}$$

Further $Z.\hat{T}$ is the transmit power of sector Z which is assumed as logarithmic-normal distributed and whose first and second moments are given. The first and second moment of the position load factor for the surface element F result as:

$$E[F.Q] = W \cdot F.\hat{N}_0 \cdot E[F.\delta_Z] + \sum_{Y \in Z^* \setminus Z} E[Y.\hat{T}] \cdot E[F.\Delta_{Z,Y}]$$

$$E[F.Q^2] = (W \cdot F.\hat{N}_0)^2 \cdot E[F.\delta_Z^2] +$$
$$\sum_{Y \in Z^* \setminus Z} W \cdot F.\hat{N}_0 \cdot E[Y.\hat{T}] \cdot E[F.\delta_Z \cdot F.\Delta_{Z,Y}] +$$
$$\sum_{\substack{Y_1, Y_2 \in Z^* \setminus Z \\ Y_1 \neq Y_2}} E[Y_1.\hat{T}] E[Y_2.\hat{T}] E[F.\Delta_{Z,Y_1} \cdot F.\Delta_{Z,Y_2}] +$$
$$\sum_{Y \in Z^* \setminus Z} E[Y.\hat{T}^2] E[F.\Delta_{Z,Y}^2]$$

The expectation values of $E[F.\delta_Z]$ and $EE[F\Delta_{Z,Y}]$ are always to be seen under the condition that the attenuation of sector Z to surface element F is maximum, i.e. the correct notation would be:

$$E\left[ F.\delta_Z \mid \text{attenuation}(Z, F) = \max_{Y \in Z^*} \{\text{attenuation}(Y, F)\} \right]$$

$$E\left[ F.\Delta_{Z,X} \mid \text{attenuation}(Z, F) = \max_{Y \in Z^*} \{\text{attenuation}(Y, F)\} \right]$$

The moments of the position load factor for a sector are determined via the position load factors of the individual surface elements.

$$E[Z.Q_S] = \frac{1}{Z.a_S} \sum_{F \in Z.\mathcal{F}} F.P_Z \cdot F.a_S \cdot E[F.Q]$$

$$= \sum_{F \in Z.\mathcal{F}} F.P_Z \cdot \frac{F.a_S}{Z.a_S} \cdot \left( \begin{array}{l} W \cdot F.\hat{N}_0 \cdot E[F.\delta_Z] + \\ \sum_{Y \in Z^* \setminus Z} E\{Y.\hat{T}\} \cdot E[F.\Delta_{Z,Y}] \end{array} \right)$$

$$= W \cdot \sum_{F \in Z.\mathcal{F}} F.P_Z \cdot \frac{F.a_S}{Z.a_S} \cdot F.\hat{N}_0 \cdot E[F.\delta_Z] +$$

$$\sum_{Y \in Z^* \setminus Z} E[Y.\hat{T}] \sum_{F \in Z.\mathcal{F}} F.P_Z \cdot \frac{F.a_S}{Z.a_S} \cdot E[F.\Delta_{Z,Y}]$$

-continued $$= W \cdot \hat{N}_0 \cdot S.E[\delta_Z] + \sum_{Y \in Z^* \setminus Z} E[Y.\hat{T}] \cdot S.E[\Delta_{Z,Y}]$$

Here it is assumed that the thermal noise for all surface elements is identical, i.e. $\forall F \epsilon F: \hat{N}_0 = F.N_0$ $$E[Z.Q_S^2] = \frac{1}{Z.a_S} \sum_{F \in Z.\mathcal{F}} F.P_Z \cdot F.a_S \cdot E[F.Q^2]$$

$$= (W \cdot \hat{N}_0)^2 \cdot S.E[\delta_Z^2] + 2 \cdot W \cdot \hat{N}_0 \cdot \sum_{Y \in Z^* \setminus Z} E[Y.\hat{T}] \cdot S.E[\Delta_{Z,Y}] +$$

$$\sum_{\substack{Y_1, Y_2 \in Z^* \setminus Z \\ Y_1 \neq Y_2}} E[Y_1.\hat{T}] E[Y_2.\hat{T}] S.E[\Delta_{Z,Y_1} \cdot \Delta_{Z,Y_2}] +$$

$$\sum_{Y \in Z^* \setminus Z} E[Y.\hat{T}^2] S.E[\Delta_{Z,Y}^2]$$

Additionally the product of the position load factors of two users with service $S_1$ and $S_2$ is required. It is assumed that the two subscribers are not located on the same surface element.

$$E[Z.Q_{S_1} Q_{S_2}] = \frac{1}{Z.a_S^2} \sum_{F_1 \in Z.\mathcal{F}} \sum_{F_2 \in Z.\mathcal{F}} F_1.P_Z \cdot F_1.a_S \cdot E[F_1.Q] F_2.P_Z \cdot$$

$$F_2.a_S \cdot E[F_2.Q]$$

$$= (W \cdot \hat{N}_0)^2 \cdot S_1.E[\delta_Z] \cdot S_2.E[\delta_Z] +$$

$$W \cdot \hat{N}_0 \cdot \sum_{Y \in Z^* \setminus Z} E[Y.\hat{T}] \cdot (S_1.E[\Delta_{Z,Y}] + S_2.E[\Delta_{Z,Y}]) +$$

$$\sum_{\substack{Y_1, Y_2 \in Z^* \setminus Z \\ Y_1 \neq Y_2}} E[Y_1.\hat{T}] E[Y_2.\hat{T}] \begin{pmatrix} S_1.E[\Delta_{Z,Y_1}] \cdot S_2.E[\Delta_{Z,Y_2}] + \\ S_2.E[\Delta_{Z,Y_1}] \cdot S_1.E[\Delta_{Z,Y_2}] \end{pmatrix} +$$

$$\sum_{Y \in Z^* \setminus Z} E[Y.\hat{T}^2] \cdot S_1.E[\Delta_{Z,Y}] \cdot S_2.E[\Delta_{Z,Y}]$$

Soft Handover

In order to include soft handover connections, additional services are defined whose service load factors are 0, which thus do not contribute to soft capacity, but to which hardware requirements are assigned.

For each service SS an additional service $S_{soft}$ is defined with:

$S_{soft}.C = S.C$ $S_{soft}.M = S.M$ $S_{soft}.E[\omega] = 0$ $S_{soft}.E[\gamma] = 0$ For determining the traffic intensity of a soft service first the surface elements are determined which come into question for soft handover. Without observance of logarithmic-normal shadowing, these are:

$$Z.\mathcal{F}_{soft} = \left\{ F \in \mathcal{F} \;\middle|\; \max_{Y \in Z^*} \{\text{attenuation}_{dB}(Y, F)\} \right.$$
$$> \text{attenuation}_{dB}(Z, F)$$
$$\left. \geq \max_{Y \in Z^*} \{\text{attenuation}_{dB}(Y_1 F) - RepRange\} \right\},$$

wherein RepRange stands for the reporting range of the system.

The traffic intensity for the soft service results then from addition of the traffic intensities of these surface elements:

$$Z.a_{S_{soft}} = \sum_{F \in Z.\mathcal{F}_{soft}} F.P_Z^{soft} \cdot F.a_S$$

If logarithmic-normal shadowing is included, the number of surface elements coming into question increases. These are then however only with a specified probability in the soft handover range:

$$Z.\mathcal{F}_{soft} = \left\{ F \in \mathcal{F} \;\middle|\; \max_{Y \in Z^*} \{\text{attenuation}_{dB}(Y, F) + PL\} \right.$$
$$> \text{attenuation}_{dB}(Z, F)$$
$$\left. \geq \max_{Y \in Z^*} \{\text{attenuation}_{dB}(Y, F) - RepRange - PL\} \right\}$$

The probability that a surface element F is in the soft handover range of Z results from:

$$F.P_Z^{soft} = P\left\{ \max_{Y \neq Z \in F.Z} \{\text{attenuation}_{dB}(Y, F) + \Theta_{Y,F}\} \right.$$
$$> \text{attenuation}_{dB}(Z, F) + \Theta_{Z,F}$$
$$\left. \geq \max_{Y \neq Z \in F.Z} \{\text{attenuation}_{dB}(Y, F) + \Theta_{Y,F} - RepRange\} \right\}$$

The traffic intensity for the soft service then results from addition of the traffic intensities of these surface elements:

$$Z.a_{S_{soft}} = \sum_{F \in Z.\mathcal{F}_{soft}} F.P_Z^{soft} \cdot F.a_S$$

The invention claimed is:

1. A method for dimensioning different hardware components at a base station of a CDMA mobile communication network, wherein the hardware components comprise modems and channel elements, wherein for each base station a minimum number of hardware components is determined for which the predefined blocking probabilities are observed, wherein in the case of restricted "soft" capacity in consideration of on-net interferences, the hardware components are dimensioned in such a way that the "soft" blocking probability, in the case of unrestricted hardware resources, is increased by no more than a predefined factor, comprising the following steps:
    dimensioning the modems and channel elements separately from one another, wherein a fixed lower bound is assumed for the number of required modems $M_{min}$ and channel elements $C_{min}$, calculating the blocking probabilities for this initial configuration of $C_{min}$ and $M_{min}$, wherein modems and channel elements are jointly considered and soft blocking is included in the uplink and downlink;

in the case of predefined blocking probabilities being fulfilled for all sectors of the base station, the dimensioning method is concluded or otherwise it is distinguished whether the soft capacity has already been reached for all sectors;

wherein in the positive case the hardware components are reduced so far that the blocking probabilities are above the pure soft blocking probabilities by no more than a value θ, and otherwise the number of hardware components is further increased, wherein the number of modems for the constant $C_{min}$ channel elements is increased until no more blocking by modems occurs, and also the number of channel elements for $M_{min}$ modems is increased, wherein this increase of the modems and channel elements is performed until either the desired blocking probabilities are reached or no more reduction of the blocking probabilities is achieved through additional hardware, since the soft capacity is achieved in the corresponding sectors, wherein the $C_{max}$ and $M_{max}$ resulting from this represent an upper limit for the required modems.

2. The method according to claim 1, wherein the blocking probabilities for all configurations with less than $C_{max}$ or $M_{max}$ are determined and from all configurations which observe the predefined blocking probabilities, the one with the lowest costs is selected.

3. The method according to claim 1, and increasing the number of hardware components in case there is at least one sector in which the predefined blocking probabilities for at least one service are not being observed but at the same time the soft capacity of this sector also has not been completely exhausted.

4. The method according to claim 1, wherein the minimum number $M_{min}$ of modems is determined by first determining only the number of modems required for reaching a predefined blocking probability.

5. The method according to claim 1, wherein the minimum number $C_{min}$ of channel elements is determined by first determining only the number of channel elements for reaching a predefined blocking probability.

6. The method according to claim 2, and increasing the number of hardware components in case there is at least one sector in which the predefined blocking probabilities for at least one service are not being observed but at the same time the soft capacity of this sector also has not been completely exhausted.

7. The method according to claim 2, wherein the minimum number $M_{min}$ of modems is determined by first determining only the number of modems required for reaching a predefined blocking probability.

8. The method according to claim 3, wherein the minimum number $M_{min}$ of modems is determined by first determining only the number of modems required for reaching a predefined blocking probability.

9. The method according to claim 2, wherein the minimum number $C_{min}$ of channel elements is determined by first determining only the number of channel elements for reaching a predefined blocking probability.

10. The method according to claim 3, wherein the minimum number $C_{min}$ of channel elements is determined by first determining only the number of channel elements for reaching a predefined blocking probability.

11. The method according to claim 4, wherein the minimum number $C_{min}$ of channel elements is determined by first determining only the number of channel elements for reaching a predefined blocking probability.

* * * * *